United States Patent [19]

Tomlinson

[11] Patent Number: 4,637,510
[45] Date of Patent: Jan. 20, 1987

[54] LINE PANS

[75] Inventor: James E. Tomlinson, Barnsley, England

[73] Assignee: Anderson Strathclyde PLC, Glasgow, Scotland

[21] Appl. No.: 859,854

[22] PCT Filed: Sep. 30, 1983

[86] PCT No.: PCT/GB83/00244
§ 371 Date: Jun. 1, 1984
§ 102(e) Date: Jun. 1, 1984

[87] PCT Pub. No.: WO84/01359
PCT Pub. Date: Apr. 12, 1984

Related U.S. Application Data

[63] Continuation of Ser. No. 617,999, Jun. 1, 1984, abandoned.

[30] Foreign Application Priority Data

Oct. 2, 1982 [GB] United Kingdom ............... 8228202

[51] Int. Cl.⁴ ............................................. B65G 19/28
[52] U.S. Cl. ................................. 198/735; 198/860.3
[58] Field of Search ................... 198/735, 860.4, 860.3

[56] References Cited

U.S. PATENT DOCUMENTS

| | | | |
|---|---|---|---|
| 3,822,011 | 7/1974 | Brava et al. | 198/735 |
| 4,282,968 | 8/1981 | Temme | 198/735 |
| 4,359,154 | 11/1982 | Temme | 198/735 |

FOREIGN PATENT DOCUMENTS

| | | | |
|---|---|---|---|
| 109221 | 11/1927 | Fed. Rep. of Germany | 198/735 |
| 1073386 | 1/1960 | Fed. Rep. of Germany | . |
| 1109087 | 6/1961 | Fed. Rep. of Germany | . |
| 1258333 | 1/1968 | Fed. Rep. of Germany | 198/735 |
| 3302422 | 7/1984 | Fed. Rep. of Germany | 198/735 |
| 1005775 | 4/1952 | France | 198/735 |
| 698169 | 10/1953 | United Kingdom | 198/735 |
| 2065056 | 6/1981 | United Kingdom | 198/735 |
| 865727 | 9/1981 | U.S.S.R. | 198/735 |
| 0994360 | 2/1983 | U.S.S.R. | 198/735 |

Primary Examiner—Joseph E. Valenza
Assistant Examiner—D. Glenn Dayoan
Attorney, Agent, or Firm—Mason, Fenwick & Lawrence

[57] ABSTRACT

A line pan for an AFC conveyor including a pair of sigma-section sides parallel and transversely spaced, a deck plate between the sides, and a base plate to which the sides are attached. The upper part of each sigma-section side and the deck plate are removably attached to the lower parts of the sigma-section sides and the base plate, and the deck plate has a transversely slidable section which can slide out of the deck plate for inspection of the conveyor components below the deck plate.

9 Claims, 9 Drawing Figures

LINE PANS

This application is a continuation of application Ser. No. 617,999, filed June 1, 1984, now abandoned.

This invention relates to line pans for Armoured Face Conveyors.

A conventional AFC conveyor comprises a series of line pans jointed end to end to form a pan section for the chain to run in and furnishings are attached by bolts to each sigma-section side of each line pan. Additionally a base plate often covers the bottom of the pan.

Several problems exist with this arrangement:
1. The furnishings continually work loose and become detached from the pan section.
2. If the pan section has a base plate attached, then access can be severely limited to the bottom chain unless doors are made in the deck plate.

Furnishings have not traditionally been premanently attached to the pan section because:
 a. The pan section and in particular, the deck plate, is subject to considerable wear and needs replacement.
 b. Furnishings on either side of the pan section are different and require to be detachable to enable the conveyor to be re-handed.

An object of the present invention is to obviate or mitigate the aforementioned problems.

According to the present invention there is provided a line pan for an AFC conveyor, wherein the upper part of each sigma-section side, and the deck plate are removably attached to the lower parts of the sigma-section sides and the base plate.

Preferably, the furnishings are permanently attached to the lower part of the sigma-section sides.

Preferably also, sheer blocks are attached to the lower part of the sides at one end of the pan and are overlain by the upper part of the sides, said blocks extending from one end of the pan for location in complementary recesses in the other end of an adjacent like pan.

Preferably also, adjacent pans are interconnected by pan connector straps which are elongate and have a pair of longitudinally spaced apertures each for engaging a retaining pin in the line pan, means being provided to secure the strap on the pins.

The upper side parts are secured to the lower side parts by any suitable means, such as bolts which locate vertically in aligned holes in flanges extending from the side wall parts, or latches in which blocks are mounted on the lower side parts and locking pins are mounted on the upper side parts to engage the blocks when the upper side parts engage the lower side parts.

An embodiment of the present invention will now be described, by way of example with reference to the accompanying drawings, in which.

Figure 1:
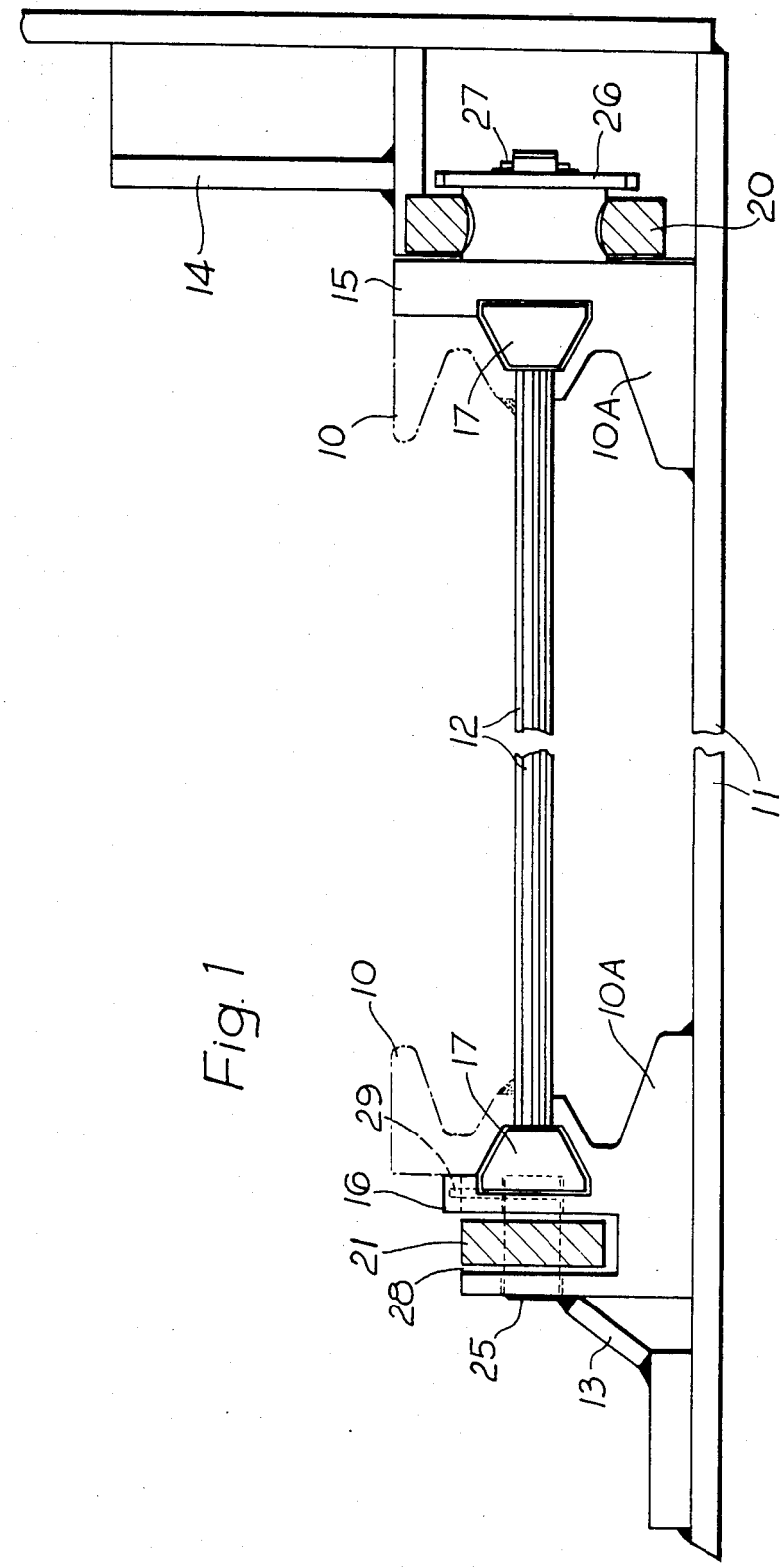
FIG. 1 is a sectional end view of an AFC line pan according to the invention, on the lines A—A of FIGS. 2 and 3.

Referring firstly to FIG. 1, the line pan comprises a pair of sigma-section sides 10, 10A mounted on a base plate 11 and a deck plate 12 between the sides. Furnishings 13, 14 are attached to each side, a ramp 13 being at the face side and a spill plate 14 at the goaf side.

The line pan is formed in two separate fabrications, namely a bottom fabrication which includes the lower parts 10A of the sides, the base plate 11 and the furnishings 13, 14, which are preferably an integral part of the bottom fabrication, and a top fabrication which includes the upper parts 10 of the sides and the deck plate 12.

Figure 5:
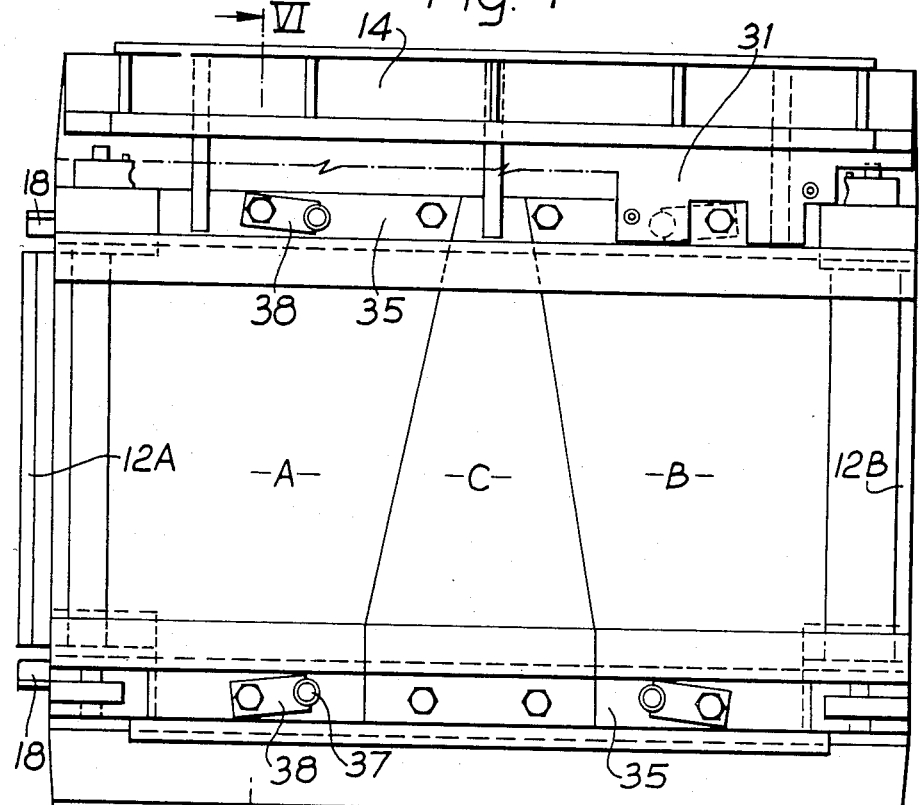

The top fabrication is made up in three sections as illustrated in FIG. 5, namely two end sections A, B and a centre section C.

The centre section C consists of a portion of the deck plate 12 and a portion of the face side sigma-section. The width of the deck plate portion narrows towards the goaf side and passes under the goaf side sigma-section which is split into two portions above the deck plate portion. The centre section C is normally secured to the bottom fabrication, as are the other two sections as hereinafter described, but it can be released and slid outwards, like a drawer from the face side of the pan to provide an inspection hatch when e.g. searching for a damaged chain below the deck plate 12. The centre or drawer section C can be slid back into position, or it can be completely removed, and then one or both end sections A, B can be released from the bottom fabrication, by being lifted up and disengaged from the adjacent pan to give a larger area for inspection or repair.

Figure 2:
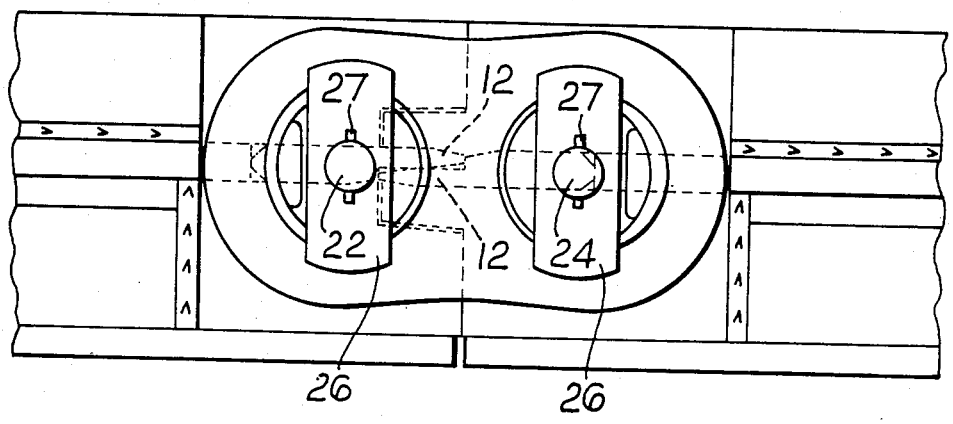
FIGS. 2 and 3 are opposite side views of the junction of two line pans.

One end of each deck plate 12, terminates in a tongue 12A and the other end has a recessed underside 12B (see FIG. 2).

The sides 10A of bottom fabrication are substantially more robust than the sides 10 of the top fabrication and include upwardly extending flanges 15, 16 between which the top fabrication locates. When the top fabrication is so located a space 17 is formed at the junction of the two parts of the sigma-section sides; this space is filled by a sheer block 18 (FIGS. 4 & 5) located at one end of each line pan so that when two pans are in abutting end to end relation the sheer blocks of one fit into the adjacent spaces 17 of the other. The sheer blocks are permanently secured to the lower fabrication.

Figure 3:
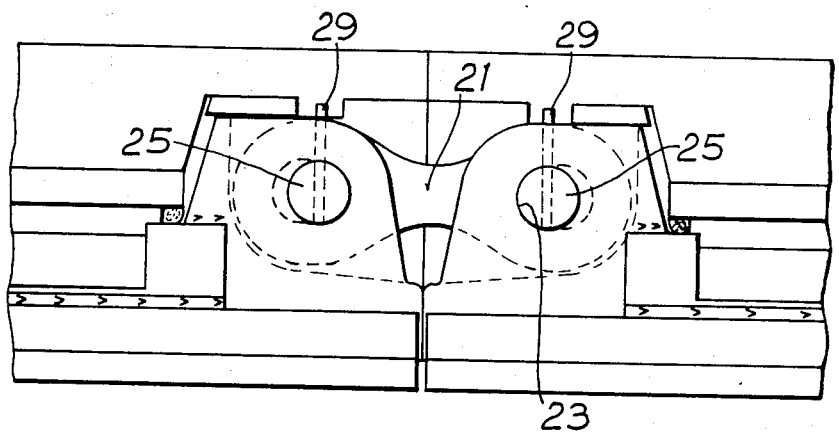

Referring also to FIGS. 2 and 3, when the line pans are in end to end relation they are interconnected by pan connector straps 20, 21, the strap 20 at the goaf side being heavier than the face side strap 21 because the goaf side, is subjected to a much higher loading, (e.g. $250^T$ to $150^T$). Each strap 20, 21 is an elongate member having two longitudinally spaced holes 22, 23 which connect with horizontal pins 24, 25 in the bottom fabrications. Vertical retainers 26 are provided at the goaf side to hold the strap 20 on its pins 24 and the retainers 26 are secured by locking pins 27. The strap 21 on the face side is located in a recess 28 in the side 10A of the bottom fabrication, the pins 25 are knocked in to engage the strap and locking pins 29 engage the inner end of the pin 25 to retain them against withdrawal.

Once bottom fabrications of the line pans are engaged end to end along the coal face, the top fabrications are mounted in position in such a manner as to allow movement of the chain along the line of deck plates 12. As illustrated in FIG. 2, the chain must move in only one direction relative to the deck plate because of the top joint between deck plates where one plate overlaps the other; chain movement in the opposite direction could snag on the overlapping end if the line pans were angled upwards due to uneven ground. The chain must therefore pass from the overlapping plate to the overlapped plate. However, the top fabrications are reversably mountable on the bottom fabrications so if the direction of chain movement is opposite to that shown in FIG. 2, the plates 12 are removed and turned around so that the overlapping end lies at the R H end of the plate 12 as opposed to the L H end as illustrated.

Figure 4:
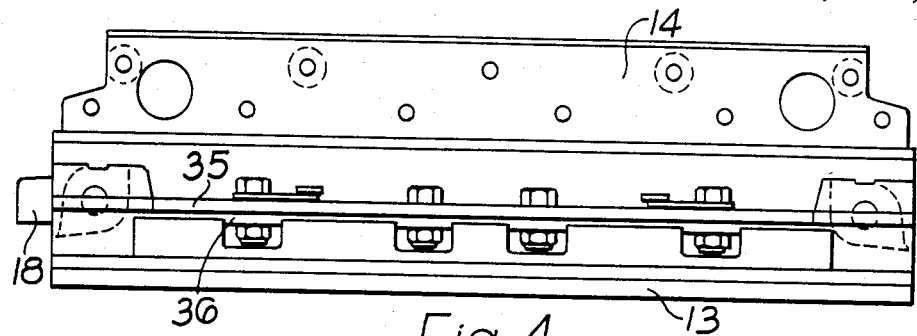
FIGS. 4, 5 and 6 are respectively side view, plan view and sectional end elevation on the line VI—VI of FIG. 5.
Figure 6:
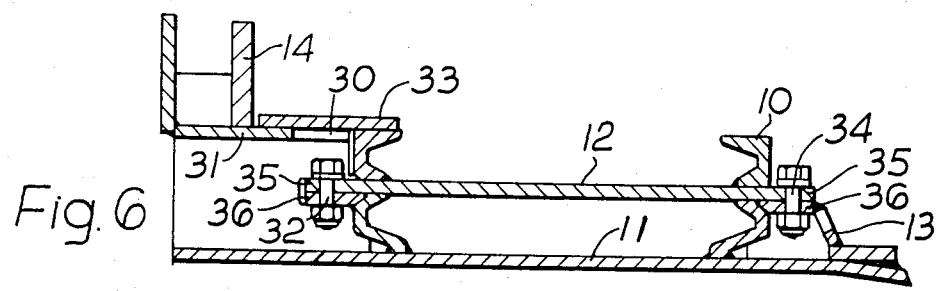
Figure 7:
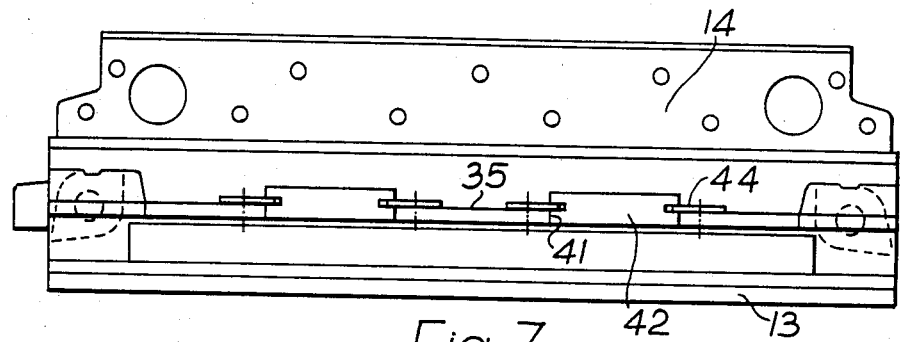
FIGS. 7, 8 and 9 are corresponding views of a modification.
Figure 8:
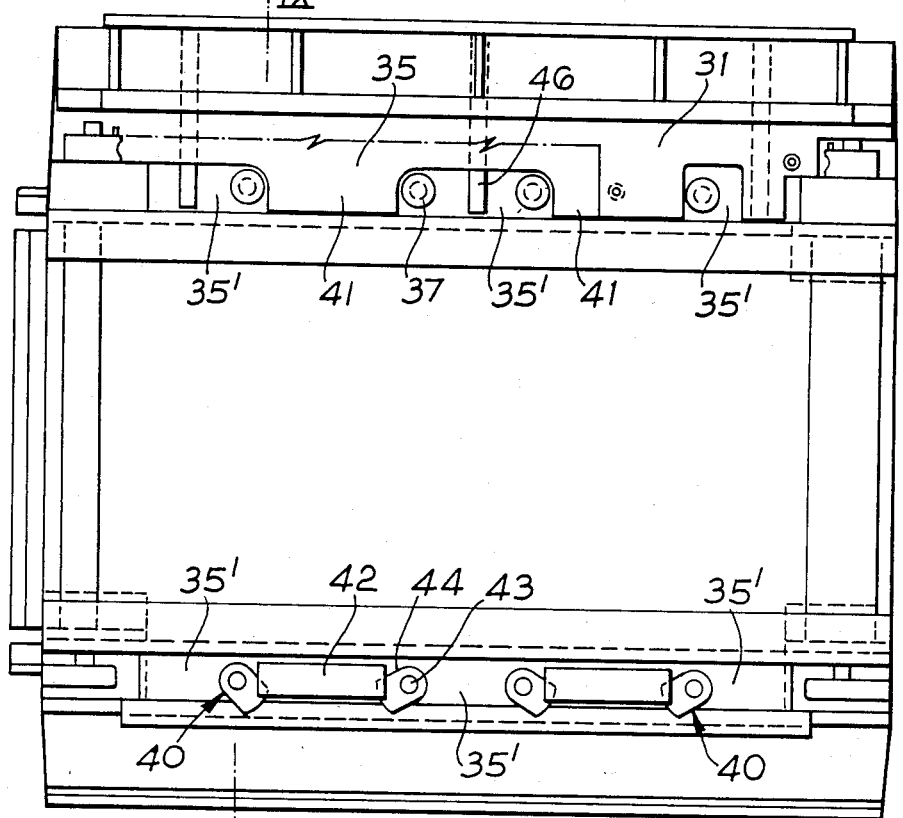
Figure 9:
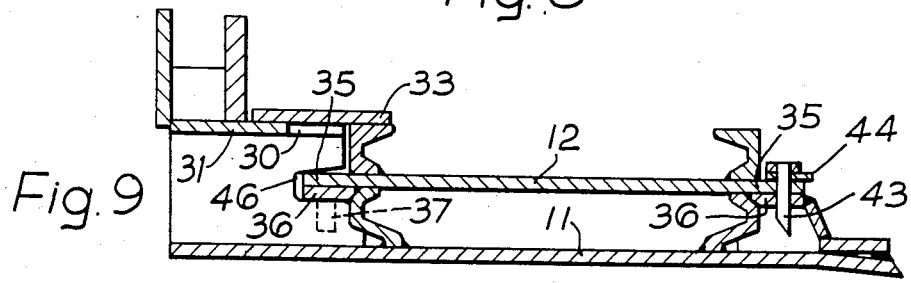

The top fabrication is detachably mounted on the bottom fabrication by any suitable means such as bolts as illustrated in FIGS. 4 to 6 or latches as illustrated in FIGS. 7 to 9, the pattern of bolts or latches being symmetrical long both sides of the top fabrication to provide for its location in either direction on the bottom fabrication.

Referring to FIGS. 4 to 6, the furnishing 14 at the goaf side has a series of apertures 30 on a horizontal plate 31, through which the bolts 32 can be passed through flanges 35, 36 of the fabrications to secure the fabrications at that side, after which a running plate 33 is mounted on the furnishing to cover the apertures 30. The bolts 34 at the face side pass through apertures in the outstanding flanges 35 on the top fabrication and 36 on the bottom fabrication.

There are four bolts at each side and also two locating dowels 37 adjacent to the outer two of each set of four bolts. These dowels 37 accurately locate the flange 35 on flange 36 and are retained by flat key members 38, carried by the adjacent bolts and apertured in alignment with holes in the flanges 35, 36 through which the dowels pass.

In the embodiment illustrated in FIGS. 7 to 9, the flanges on the top fabrication are formed by three lugs 35' projecting from each side of the deck plate 12. On the face side, the spaces 41 between the lugs 35' accommodate upstanding blocks 42 on the face side of the lower fabrication. The lugs 35' have apertures to receive latches 40 for engagement with slots in the blocks 42.

Each latch comprises a shank 43 which is driven into the face side holes in the flanges 35', 36 and a flat wing 44 mounted on the shank 43 for horizontal rotation between latched and unlatched positions. The wings of the latch are wedge shaped and can be rotated into the horizontal slots in the retaining blocks 42. Thus the wings 44 restrain the flanges 35', 36 vertically while the shank 43 restrains them horizontally.

On the goaf side, vertical restraint is achieved by protrusions 46 on the lower fabrication whch extend over the top flange and trap if vertically, while horizontal restraint at the goaf side is achieved by locating pins 45 located in the holes on the goaf side flanges 35', 36.

The top and bottom fabrications are therefore easily separated and this is of advantage for repair or maintenance of the lower run of the chain. To find a damaged area, the "top drawer" C of a line pan is released and pulled out far enough for inspection then pushed back in again if no damage is found and the procedure repeated along as many line pans as is necessary. Once the damaged area has been located two or three top fabrications can be removed to allow access to the lower run of chain with sufficient space available for the work force to carry out its duties. This feature compares favourably with the present inspection hatch in known line pans.

Other advantages of the line pan hereinbefore described with reference to the drawings are:

(1) The troublesome bolted attachment between pan section and furnishings has been removed but the ability to re-hand the conveyor has been preserved;

(2) The deck plate, where most wear is concentrated, is built into a smaller, cheaper unit that is easily replaceable.

(3) Better access can be gained to the bottom chain;

(4) The space between pan section and furnishings can be used to construct a stronger flexible joint between conveyor/pan sections.

The features that control conveying direction such as lapped joint on the deckplate, are contained in the top fabrication. The top fabrication can be mounted into the pan section in either direction due to a symmetrical pattern to the mounting holes.

All features relating to the mechanical jointing of the pans is integrated into the bottom fabrication to enable the pan line to remain intact even when the top section is removed.

I claim:

1. A line pan for an AFC conveyor comprising a pair of sigma-section sides parallel and transversely spaced, a deck plate between the sides and a base plate to which the sides are attached, characterised in that the upper part of each sigma-section side and the deck plate are removably attached to the lower parts of the sigma-section sides and the base plate, said deck plate having a transverse slidable coplanar section supported for sliding movement out of an opening formed between the upper and lower parts of at least one sigma-section side for inspection of line pan conveyor components below such base plate slidable section.

2. A line pan according to claim 1 characterised in that the upper part of each sigma-section side and the deck plate form a top fabrication and the lower part of each sigma-section side and the base plate form a bottom fabrication.

3. A line pan according to claim 2 characterised in that furnishings are permanently attached to the lower sigma-section side parts and base plate and form part of the bottom fabrication.

4. A line pan according to any one of claims 1 to 3 characterised in that sheer blocks are attached to the lower part of the sides at one end of the pan and are overlain by the upper part of the sides, said blocks extending from one end of the pan for location in complementary recesses in the other end of an adjacent line pan.

5. A line pan according to claim 1, characterised in that pan connector straps interconnect adjacent pans of an AFC conveyor at the face side and the goaf side thereof, said straps being elongate and having a pair of longitudinally spaced apertures each for engaging a retaining pin in the line pan, means being provided to secure the straps on the pins.

6. A line pan according to claim 1, characterised in that the upper sigma-section side parts are secured to the lower side parts by bolts which locate vertically in aligned holes in flanges extending from the side wall parts.

7. A line pan according to claim 1 characterised in the upper side parts are secured to the lower side parts by latches in which blocks are mounted on the lower side parts and locking pins are mounted on the upper side parts to engage the blocks when the upper side parts engage the lower side parts.

8. A line pan according to claim 1, wherein said deck plate has at its ends a lap joint member where at one end is an overlapping member and the other end is an underlying member whereby, when a line pan is secured end to end with another like line pan, the overlapping member of one pan overlies the underlying member of the adjacent pan.

9. A line pan for an AFC conveyor as defined in claim 8, wherein a portion of the line pan includes a top fabrication and a lower fabrication, the top fabrication being reversible relative to the lower fabrication so that the overlapping member of the deck plate can be located at either end of the line pan.

* * * * *